United States Patent
Wei et al.

(10) Patent No.: US 10,800,686 B2
(45) Date of Patent: Oct. 13, 2020

(54) APPARATUS AND METHOD FOR REMOVING NITROGEN AND PHOSPHORUS FROM SEWAGE BY USING SPONGE IRON AND ACTIVATED SLUDGE

(71) Applicants: SOUTH CHINA INSTITUTE OF ENVIRONMENTAL SCIENCES. MEP, Guangzhou (CN); ANHUI NORMAL UNIVERSITY, Wuhu (CN)

(72) Inventors: Dongyang Wei, Guangzhou (CN); Yonggang Wu, Wuhu (CN); Xiang Wei, Guangzhou (CN); Wenting Jiang, Wuhu (CN); Tao He, Guangzhou (CN); Xiaowen Liu, Guangzhou (CN); Xi Chen, Guangzhou (CN); Wen Zhou, Guangzhou (CN); Jialiang Zhu, Guangzhou (CN)

(*) Notice: Subject to any disclaimer, the term of this patent is extended or adjusted under 35 U.S.C. 154(b) by 0 days.

(21) Appl. No.: 16/153,848

(22) Filed: Oct. 8, 2018

(65) Prior Publication Data
US 2020/0109073 A1    Apr. 9, 2020

(51) Int. Cl.
*C02F 3/12* (2006.01)
*C02F 3/34* (2006.01)
(Continued)

(52) U.S. Cl.
CPC .............. *C02F 3/1226* (2013.01); *C02F 1/66* (2013.01); *C02F 3/107* (2013.01); *C02F 3/1215* (2013.01); *C02F 3/1263* (2013.01); *C02F 3/1278* (2013.01); *C02F 3/302* (2013.01); *C02F 3/346* (2013.01); *C02F 2003/001* (2013.01); *C02F 2101/105* (2013.01); *C02F 2101/16* (2013.01); *C02F 2209/22* (2013.01)

(58) Field of Classification Search
CPC .... C02F 3/1226; C02F 3/1278; C02F 3/1215; C02F 3/1263; C02F 2101/16; C02F 2101/105
USPC .................. 210/615, 617, 742, 743
See application file for complete search history.

(56) References Cited

U.S. PATENT DOCUMENTS

| | | | | |
|---|---|---|---|---|
| 4,184,947 A | * | 1/1980 | Demisch | C02F 1/281 210/617 |
| 4,382,865 A | * | 5/1983 | Sweeny | A62D 3/37 210/503 |

(Continued)

OTHER PUBLICATIONS

Ivanov et al., Phosphate removal from the returned liquor of municipal wastewater treatment plant using iron-reducing bacteria, Journal of Applied Microbiology, 98, 1152-1161. (Year: 2005).*

*Primary Examiner* — Nam X Nguyen
*Assistant Examiner* — Julia L. Wun
(74) *Attorney, Agent, or Firm* — W&K IP (57) ABSTRACT

An apparatus and a method for removing nitrogen and phosphorus from sewage by using sponge iron and activated sludge are disclosed herein. The apparatus comprises a raw tank, a pH adjusting tank, a primary SBR reactor, a secondary SBR reactor, an intermediate tank, and a discharge tank; by modification of sponge iron, preparation of composite filler, sludge inoculation and domestication, and sewage treatment, an effect of simultaneous denitrification and dephosphorization is achieved in one reactor using the combined action of sponge iron and activated sludge with high nitrogen and phosphorus removal efficiency.

7 Claims, 2 Drawing Sheets

(51) Int. Cl.
   *C02F 3/10*      (2006.01)
   *C02F 1/66*      (2006.01)
   *C02F 101/10*    (2006.01)
   *C02F 101/16*    (2006.01)
   *C02F 3/00*      (2006.01)
   *C02F 3/30*      (2006.01)

(56) References Cited

U.S. PATENT DOCUMENTS

| | | | | |
|---|---|---|---|---|
| 4,956,093 | A * | 9/1990 | Pirbazari | B01D 61/16 |
| | | | | 210/616 |
| 4,976,863 | A * | 12/1990 | Stearns | C02F 1/24 |
| | | | | 210/608 |
| 5,288,405 | A * | 2/1994 | Lamb, III | C02F 3/006 |
| | | | | 210/195.1 |
| 5,593,592 | A * | 1/1997 | Kagawa | C02F 1/5236 |
| | | | | 210/611 |
| 6,551,511 | B1 * | 4/2003 | Murasawa | C02F 3/10 |
| | | | | 210/610 |
| 6,858,142 | B2 * | 2/2005 | Towndrow | C02F 3/302 |
| | | | | 210/602 |
| 7,378,022 | B2 * | 5/2008 | Lupton | C02F 3/2806 |
| | | | | 210/151 |
| 7,771,565 | B2 * | 8/2010 | Kirov | D21B 1/16 |
| | | | | 162/24 |
| 8,721,888 | B2 * | 5/2014 | Lee | C02F 3/101 |
| | | | | 210/150 |
| 2010/0230344 | A1 * | 9/2010 | Srinivas | A01N 59/16 |
| | | | | 210/285 |
| 2013/0075327 | A1 * | 3/2013 | Yuan | C02F 3/1205 |
| | | | | 210/605 |
| 2017/0355979 | A1 * | 12/2017 | Bae | C12N 11/10 |
| 2018/0230033 | A1 * | 8/2018 | Cumbie | C02F 3/06 |
| 2019/0352196 | A1 * | 11/2019 | Hussien | B01J 20/0229 |

* cited by examiner

APPARATUS AND METHOD FOR REMOVING NITROGEN AND PHOSPHORUS FROM SEWAGE BY USING SPONGE IRON AND ACTIVATED SLUDGE

TECHNICAL FIELD

The present invention relates to an apparatus and a method for removing nitrogen and phosphorus in sewage by using sponge iron and activated sludge.

BACKGROUND

In recent years, due to continuous development of sewage treatment fillers, carrier—bound microbiological immobilization method has become popular. It is a method to keep free cells or enzymes active and reusable by positioning the same within a defined spatial region using chemical or physical means, which has an advantage of high biological density and rapid response. In particular, organic porous carriers, which is represented by polyurethane foam, provide an aerobic and anoxic microenvironment required for the growth of nitrifying bacteria due to its unique spatial structure, thereby providing reactors with the possibility for simultaneous nitrification and denitrification. The carriers, though greatly increase the rate of denitrification in the aerobic reactor, have little effect on phosphorus removal. Studies have demonstrated that zero-valent iron materials can improve the treatment effect of the reactor to a certain extent through the improvement of microbial activity and chemical flocculation, especially iron will react with phosphorus to precipitate such that the phosphorus removal effect is enhanced.

Sponge iron has characteristics of large specific surface area and high specific surface energy due to its loose spongy structure, meanwhile it also has properties as strong electrochemical enrichment, redox, physical adsorption, and flocculation precipitation. Sponge iron as an immobilized biological carrier filler has the following advantages: 1) provides sufficient space for microbial enrichment and growth, and provides a good "microenvironment" for the synergistic symbiosis of various aerobic, facultative, and anaerobic microorganisms in biochemical reactors; 2) can form a large number of primary batteries due to the special chemical composition, the nascent state $Fe^{2+}$ produced by the electrode reaction, and the further oxidized $Fe^{3+}$ and their hydrates, under the action of precipitation, flocculation, adsorption and sweeping, etc. may greatly reduce the concentration of nitrogen and phosphorus in the sewage; 3) has the effect of biological iron, which can enhance the purification function of activated sludge. However, in practical engineering applications, sponge iron has the problems of easy sinking, poor fixation, and small contact with the sewage, and in particular, it will be difficult to directly feed into a biochemical pool owing to its hardening.

How to improve the efficiency and effectiveness of nitrogen and phosphorus removal from sewage by using sponge iron has become a hotspot in research.

SUMMARY OF THE INVENTION

With regard to the problems existing in the prior art, the present inventors have surprisingly found that the nitrogen and phosphorus removal efficiency can be improved by modifying sponge iron and inoculating activated sludge as compared with the conventional sewage treatment using the sponge iron.

An object of the present invention is to provide a method for removing nitrogen and phosphorus from sewage, comprising steps of sponge iron modification, preparation of a composite filler, inoculation and domestication of sludge, and sewage treatment.

In the above solution,
1) treating the sponge iron with a dilute acid solution, rinsing to neutral, and then treating with copper sulfate solution, filtering to remove the solution to obtain a modified sponge iron solid;
2) crushing the above modified sponge iron solid and mixing with a montmorillonite, a porous glass, a calcined clay, a magnesia, a bauxite, a photocrosslinked prepolymer, and a paulownia coarse granule to obtain a first solid phase mixture, mixing an ethylene glycol powder with an ethylene glycol, extruding, pelletizing, and then mixing with the first solid phase mixture, adding a nano silica and a chemical foaming agent, mixing to obtain a second solid phase mixture, extruding to obtain the composite filler;
3) adjusting the pH of the sewage to neutral, immersing the composite filler, inoculating the activated sludge to a sludge concentration of 1200-2600 mg/L, and passing air under a condition of only exposure to air without water inlet to render a dissolved oxygen content of 0.21-0.5 g/L, and then stopping the air and precipitating for 0.5-1 h, and then passing the sewage in neutral pH and the air again in the condition of only exposure to air without water inlet until a dissolved oxygen concentration of 0.5-0.8 g/L, then stopping the air and precipitating for 1.5-3 h to obtain acclimated sludge;
4) adding the above acclimated sludge in a volume ratio of sewage to be treated: acclimated sludge=1.5 to 3:1,
i) subjecting to an initial operation, running at a hydraulic retention time (HRT) of 10 h for 3 to 8 days under a dissolved oxygen concentration (DO) of 2.3 to 3.5 mg/L, and then reducing the hydraulic retention time (HRT) to 8 h and running for 4 to 7 days, and then reducing the hydraulic retention time (HRT) to 3 to 4 hours and running for 1 to 5 days;
ii) continuous running with a hydraulic retention time of 6 to 8 h for 5 to 7 days under a dissolved oxygen concentration (DO) of 0.01 mg/L≤DO<0.08 mg/L; the sludge is removed in each operation cycle after the initial operation till a sludge drying tank stage, 25% of the activated sludge is retained for use in the next operation cycle, no additional acclimated activated sludge is added, and the composite filler is replaced every 5-8 cycles.

According to an aspect of the present invention, the method for removing nitrogen and phosphorus from sewage may comprise the following steps:
1) washing the sponge iron with the dilute acid solution, and then heating under reflux with the dilute acid solution, by controlling the temperature not exceed 60° C., after heating is stopped, rinsing the solution with a deionized water to neutral; placing the solution in the copper sulfate solution to react and controlling the temperature of the solution to 32-36° C., removing the remaining solution by filtration and washing the solid portion with pure water and drying to obtain the modified sponge iron solid;
2) crushing the above modified sponge iron, and mixing with the montmorillonite, the porous glass, the calcined clay, the magnesia, the bauxite, the photocrosslinked prepolymer and the paulownia coarse particle according to the following weight parts: 25 to 43 parts of modified sponge iron, 6 to 9 parts of montmorillonite, 1 to 4 parts of porous glass, 2 to 3 parts of calcined clay, 1.2 to 6 parts of magnesium oxide, 1.5 to 3.5 parts of bauxite, 5 to 11 parts of photocrosslinked prepolymers and 20 to 22 parts of paulownia coarse particle to obtain the first solid phase mixture, the paulownia coarse particle is made from branches of natural Paulownia through cutting, steaming and crushing; further mixing 140 to 230 parts of polyethylene glycol and 10 to 80 parts of ethylene glycol, extruding and pelleting to obtain pellets, mixing the pellets with the first solid phase mixture, and then adding 0.2 to 3 parts of nanosilica, 0.06 to 1 parts of chemical foaming agent, mixing uniformly to obtain the second solid phase mixture, and extruding to obtain the composite filler;

3) immersing the above composite filler with the sewage of neutral pH, inoculating the activated sludge to a sludge concentration of 1200-2600 mg/L, and passing air under a condition of only exposure to air without water inlet to render a dissolved oxygen content of 0.21-0.5 g/L, and then stopping the air and precipitating for 0.5-1 h, and then passing the sewage in neutral pH and air again in the condition of only exposure to air without water inlet until a dissolved oxygen concentration of 0.5-0.8 g/L, then stopping the air and precipitating for 1.5-3 h to obtain the acclimated sludge;

4) adding the above acclimated sludge in a volume ratio of sewage to be treated: acclimated sludge=1.5 to 3:1, i) subjecting to an initial operation, running at a hydraulic retention time (HRT) of 10 h for 3 to 8 days under a dissolved oxygen concentration (DO) of 2.3 to 3.5 mg/L, and then reducing the hydraulic retention time (HRT) to 8 h and running for 4 to 7 days, and then reducing the hydraulic retention time (HRT) to 3 to 4 hours and running for 1 to 5 days;

ii) continuous running at a hydraulic retention time of 6 to 8 h for 5 to 7 days under a dissolved oxygen concentration (DO) of 0.01 mg/L≤DO<0.08 mg/L; the sludge is removed in each operation cycle after the initial operation till a sludge drying tank stage, 25% of the activated sludge is retained for use in the next operation cycle, no additional acclimated activated sludge is added, and the composite filler is replaced every 5-8 cycles.

According to an aspect of the present invention, the method for preparing the paulownia coarse grain is: washing branches of the natural Paulownia, cutting into segments of 3 to 20 cm in length, uniformly spraying on the surface with 3% in weight concentration of sodium bicarbonate solution, placing in a steam oven with steam for 2-5 h, removing and cooling to room temperature, drying, crushing with a pulverizer to obtain a coarse grain in a diameter of 1-3 mm.

According to an aspect of the present invention, the activated sludge is prepared by mixing the remaining fresh sludge from sewage treatment plant and granular sludge from anammox and anaerobic granular sludge at a volume ratio of 2:1 so that the concentration of the granular sludge is about 3 to 5 g/L, the mixed activated sludge contains both aerobic bacteria and anaerobic bacteria.

Further, the activated sludge is also inoculated with iron bacteria, preferably, the percentage of the iron bacteria in the total weight of the activated sludge is 0.03-0.1 wt %, which can realize the oxidation of iron, by the biological oxidation of FeP→Fe2+Fe3+, a complementary effect can be achieved by the composite filler made therefrom with sponge iron in a same reactor, especially the phosphorus removal efficiency is improved.

Further, the replaced composite filler may be subjected to recycle treatment: the composite filler that is replaced after 5 to 8 cycles is subject to microwave radiation treatment, and the microwave power is 1100-1300 W, and the processing time is 3-10 min, then is washed with pure water to neutral, dried, mixed with equal weight of polyethylene glycol powder and 0.2-3% of ethylene glycol, extruded and pelletized with a twin-screw extruder to obtain pellets, the pellets and the microwave-treated composite filler are mixed, then 0.1 to 0.5% of a chemical foaming agent is added, mixed uniformly, and extruded using multiple single-screw extruders in series to obtain a regenerated composite filler, which can further be used for 2-4 cycles.

Another object of the present invention is to provide an apparatus for removing nitrogen and phosphorus in sewage by using sponge iron and activated sludge to realize rapid and efficient nitrogen and phosphorus removal.

In particular, an apparatus for removing nitrogen and phosphorus from sewage using sponge iron and activated sludge, comprising a raw tank for accommodating sewage, a pH adjusting tank connected to the raw tank to adjust the pH of the sewage to neutral and is provided at bottom with a first vent valve for discharging sewage and sludge, a temperature adjustment device inside the pH adjusting tank to adjust the temperature of the sewage to 28-32° C., a primary SBR reactor connected to the pH adjusting tank for accommodating the composite filler prepared from the sponge iron, acclimating the activated sludge and conducting sewage treatment, an intermediate tank connected to the primary SBR reactor and is provided at bottom with a second vent valve for emptying the sewage, a secondary SBR reactor connected to the intermediate tank and the pH adjusting tank, respectively, for accommodating the composite filler prepared from the sponge iron, acclimating the activated sludge and conducting sewage treatment, and a discharge tank connected to the secondary SBR reactor and is provided at bottom with a third vent valve for discharging sewage and sludge.

In the above solution, the primary SBR reactor may comprise: a first aeration device located at a lower part, which is supplied by an external first air pump, wherein a first gas flow control valve is provided at a pipeline between the first aeration device and the first air pump, a first support plate above the first aeration device, a first filler stents mounted between the first support plate and the top of the primary SBR reactor for accommodating the composite filler prepared from sponge iron, a first agitator between the first aeration device and the first support plate, the first agitator being driven by a first drive motor located outside the primary SBR reactor, a dissolved oxygen concentration measuring device for determining the dissolved oxygen concentration in the primary SBR reactor, and a first drain valve located at an upper part for discharging the sewage in the primary SBR reactor to the intermediate tank.

Particularly suitably, the volume of the first filler stents accounts for ⅗ to ⅘ of the total volume of the primary SBR reactor.

In the above solution, the secondary SBR reactor may comprise: a second aeration device located at a lower part, which is supplied by an external second air pump, wherein a second gas flow control valve is provided at a pipeline between the second aeration device and the second air pump, a second support plate above the second aeration device, a second filler stents mounted between the second support plate and the top of the secondary SBR reactor for accommodating the composite filler prepared from sponge iron, a second agitator between the second aeration device and the second support plate, the second agitator being driven by a second drive motor located outside the secondary SBR reactor, a dissolved oxygen concentration measuring device for determining the dissolved oxygen concentration in the secondary SBR reactor, and a second drain valve located at an upper part for discharging the sewage in the secondary SBR reactor to the discharge tank.

Particularly suitably, the volume of the second filler stents accounts for ⅗ to ⅘ of the total volume of the secondary SBR reactor.

In the abovementioned solution, the apparatus may further comprise a multi-stage filtration adsorption column to purify water from the discharge tank, and discharge the purified water from an outlet of the multi-stage filtration adsorption column.

In one or more of the above aspects, a first to fourth inlet pumps are provided between the pH adjustment tank and the primary SBR reactor and the secondary SBR reactor, between the intermediate tank and the secondary SBR reactor, and between the discharge tank and the multi-stage filtration adsorption column, for pumping sewage between the respective containers, the first inlet water pump, the second inlet water pump, the third inlet water pump, the first gas flow control valve, and the second gas flow control valves are all electrically connected to the PLC automation controller for control operation.

According to an aspect of the present invention, the method of removing nitrogen and phosphorus from sewage according to the present invention may be performed in the apparatus according to the present invention.

Beneficial Effects of the Present Invention

In the present invention, sponge iron is made into a suitable composite filler and fed into a reactor, inoculates activated sludge, and used for two-phase treatment of sewage by SBR reactors, aerobic nitrification and anaerobic denitrification are alternatively conducted by combined action of sponge iron, activated sludge and iron bacteria, and by the control of the concentration of dissolved oxygen in the SBR reactors, such that an effect of simultaneous denitrification and dephosphorization is achieved in one reactor, the present method for sewage treatment has excellent effect on nitrogen and phosphorus removal.

EMBODIMENTS

Materials and reagents used in the examples are all conventionally used in the art or commercially available unless otherwise specified.

Example 1

Figure 1:
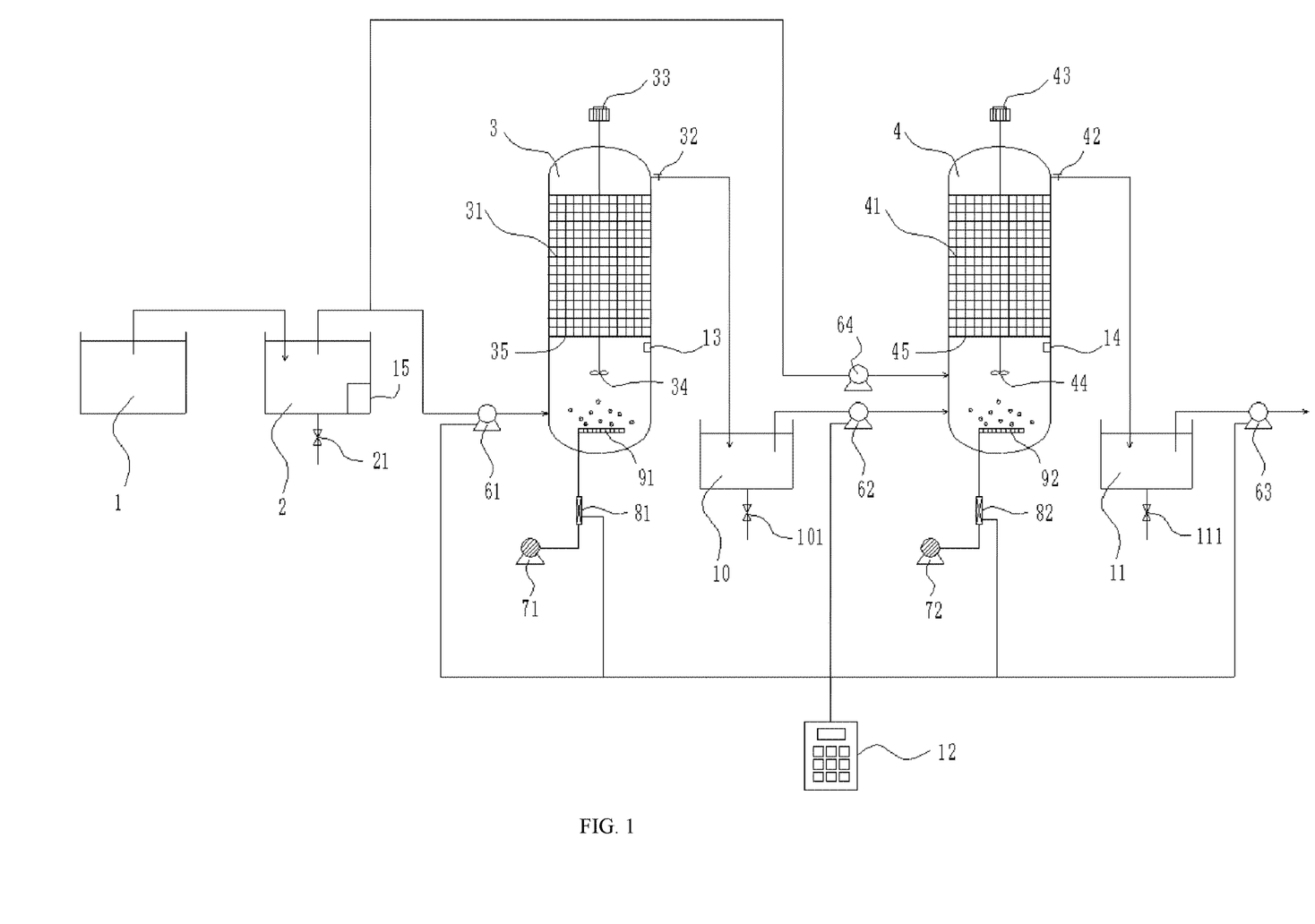
FIG. 1 is a schematic structural view of an apparatus according to a first embodiment of the present invention.

As shown in FIG. 1, an apparatus for removing nitrogen and phosphorus from sewage using sponge iron and activated sludge, comprising a raw tank 1 for accommodating sewage, a pH adjusting tank 2 connected to the raw tank 1 and is provided at bottom with a first vent valve 21, pH of the sewage in the pH adjusting tank 2 is adjusted to neutral and pumped to a primary SBR reactor 3 via a first inlet pump 61 for primary treatment, the treated sewage is discharged to an intermediate tank 10 through a first drain valve 32, the intermediate tank 10 is provided at bottom with a second vent valve 101, and sewage therein is pumped to a secondary SBR reactor 4 via a second inlet pump 62 for secondary treatment, sewage in the pH adjusting tank 2 is further pumped to the secondary SBR reactor 4 via a fourth inlet pump 4, and discharged to a discharge tank 11 through a second drain valve 42 and further pumped out through a third inlet pump 63. The primary and the secondary SBR reactor 3, 4 comprise therein: aeration devices 91, 92 located at a lower part and supplied by external air pumps 71, 72, gas flow control valves 81, 82 provided on the pipelines between the aeration devices 91, 92 and the air pumps 71, 72, respectively, support plates 35, 45 above the aeration devices 91, 92, filler stents 31, 41 mounted between the support plates 35, 45 and the top of the SBR reactors 3, 4 for accommodating composite fillers made of sponge iron, agitators 34, 44 between the aeration devices 91, 92 and the support plates 35, 45 which are driven by drive motors 33, 44 located outside the SBR reactors 3, 4 and dissolved oxygen concentration measuring devices 13, 14 for determining the dissolved oxygen concentration in the reactors 3, 4. The volume of the filler stents 31, 34 accounts for $3/5$ to $4/5$ of the total volume of the SBR reactors 3, 4.

A general urban sewage is selected as the raw water, the sampling volume is 100 L, the sampling is repeated twice. The main water quality indicators are determined by a water quality analyzer as: CODCr=360-400 mg/L, BOD5=120-260 mg/L, SS=120-250 mg/L, ammonia nitrogen=25-50 mg/L, TN=13-60 mg/L, TP=3-7 mg/L.

The nitrogen and phosphorus removal from sewage is conducted using the present apparatus, comprising:

1) 10 g of sponge iron is washed with 80 ml of 4 wt % diluted acid solution for 10 s, and then heated under reflux with 190 ml of 3 wt % diluted acid solution for 60 s by controlling the temperature not to exceed 60° C., after heating is stopped, rinsed with deionized water to neutral; placed in 15 ml of 15 wt % copper sulfate solution, with the temperature of the solution being controlled at 32° C., reacts for 10 minutes, and the remaining solution is removed by filtration, the solid portion is washed with pure water and dried, to obtain a modified sponge iron;

2) the above modified sponge iron is crushed to 1.6 mm, and mixed with montmorillonite, porous glass, calcined clay, magnesia, bauxite, photocrosslinked prepolymer and paulownia coarse particles according to the following weight parts: 25 parts of modified sponge iron, 6 parts of montmorillonite, 1 part of porous glass, 2 parts of calcined clay, 1.2 parts of magnesium oxide, 1.5 parts of bauxite, 5 parts of photocrosslinked prepolymers and 20 parts of paulownia coarse particles to obtain a first solid phase mixture, the paulownia coarse particles is made as follows: branches of the natural Paulownia is washed, cut into segments of 3 cm in length, uniformly sprayed on the surface with 3% in concentration of sodium bicarbonate solution, placed in a steam oven with steam for 2 h, removed and cooled to room temperature, dried, crushed with a pulverizer to obtain a coarse grain in a diameter of 1 mm. 140 parts of polyethylene glycol and 10 parts of ethylene glycol are further mixed, extruded by a twin-screw extruder and pelletized to obtain pellets, the pellets are mixed with the first solid phase mixture, and then 0.2 parts of nanosilica, 0.06 parts of chemical foaming agent are added, mixed uniformly to obtain the second solid phase mixture, and extruded with multiple single screw extruders in series to obtain the composite filler;

3) the abovementioned composite filler is filled into a first filler stents 31 of a primary SBR reactor 3 with a filling ratio of 42%, the sewage is adjusted to pH 6.5 through a pH adjusting tank 2, and is controlled to a temperature of 28° C., the first inlet pump 61 is open, and the second inlet pump 62 is closed to pass the sewage to be treated to the primary SBR reactor 3 until the composite filler therein is fully immersed, and the activated sludge is inoculated into the primary SBR reactor 3, the activated sludge is prepared by mixing the remaining fresh sludge from sewage treatment plant and granular sludge from anammox and anaerobic granular sludge at a volume ratio of 2:1 so that the concentration of the granular sludge is about 3 g/L. The sludge concentration in the primary SBR reactor 3 after inoculation reaches 1200 mg/L, air is passed to the primary SBR reactor 3 through a first air pump 71 so that the dissolved oxygen concentration is 0.21 g/L, and then air is stopped and precipitates for 0.5 hour, and the sewage is discharged through a first drain valve 32 to the intermediate tank 10, the sewage to be treated with pH value of 6.5 was pumped into the primary SBR reactor 3 again under a condition of only exposure to air without water inlet, air is passed into the primary SBR reactor 3 so that the dissolved oxygen concentration is 0.5 g/L, and then air is stopped and precipitates for 1.5 hours, the sewage is discharged to the intermediate tank 10, and the sludge acclimation is completed;

the fourth inlet pump 64 is open and the second inlet pump 62 is kept closed, a secondary SBR reactor 4 is filled with the composite filler and inoculated with activated sludge by the same method, the filling ratio in the secondary SBR reactors 4 is 42%, such that the sludge acclimation is completed according to the above operation method;

4) the fourth inlet pump 64 is closed, the second inlet pump 62 is open, the acclimated sludge obtained above is added according to a volume ratio of sewage to be treated: acclimated sludge=1.5:1 for the initial operation, operation is conducted under a Dissolved Oxygen concentration (DO) of 2.3 mg/L in the sewage treatment system, firstly controls the hydraulic retention time HRT to 10 h and runs for 3 days, then reduces the hydraulic retention time HRT to 8 h and runs for 4 days, then reduces the hydraulic retention time HRT to 3-4 h and runs for 1 day; continues to run under the condition that the Dissolved Oxygen concentration DO in the system is 0.01 mg/L, the hydraulic retention time is 6 h for 5 days; the sludge of SBR reactor is removed in each operation cycle after the initial operation till the stage of sludge drying tank, 25% of the activated sludge is retained for use in the next operation cycle, no additional acclimated activated sludge is added, and the composite filler is replaced every 5 cycles.

the main water quality indicators of the effluent are determined and the results are: CODCr=10-20 mg/L, BOD5=1-2 mg/L, SS=0 mg/L, Ammonia nitrogen=0.5-4 mg/L, TN=1-7 mg/L, TP<0.3 mg/L, removal efficiency: CODCr≥96%, BOD5≥97%, SS=100%, TN≥87%, TP≥92%.

Example 2

Example 2 is substantially the same as Example 1, except that the activated sludge is further inoculated with iron bacteria, and the iron bacteria account for 0.03 wt % of the total weight of the activated sludge. The results are: CODCr=10-20 mg/L, BOD5=1-2 mg/L, SS=0 mg/L, TN=1-5.8 mg/L, TP<0.26 mg/L, removal efficiency: CODCr≥96%, BOD5≥97%, SS=100%, TN≥90.6%, TP≥95%.

Conclusion: After the inoculation of iron bacteria in activated sludge, the removal of phosphorus is significantly enhanced.

Example 3

Figure 2:
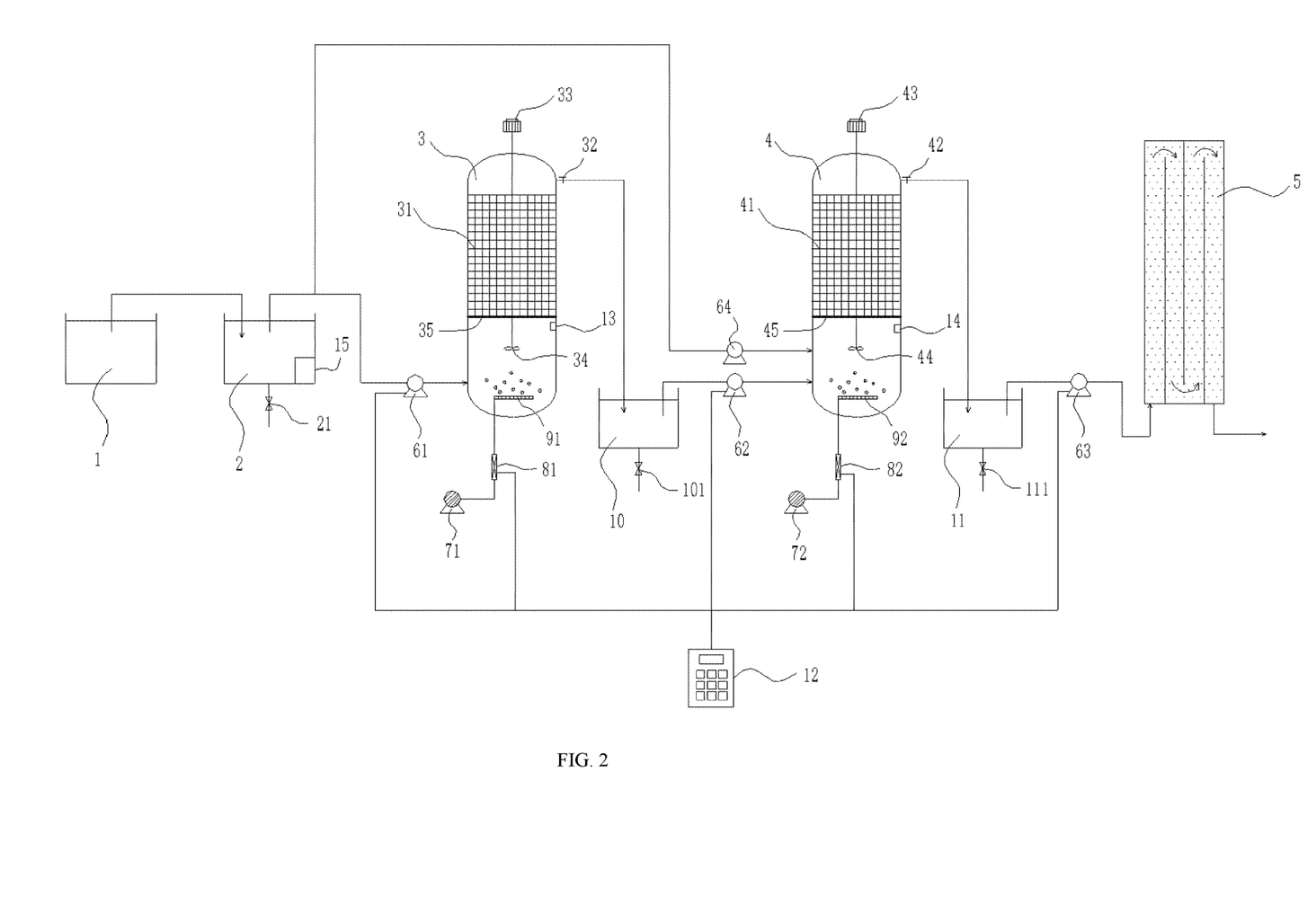
FIG. 2 is a schematic structural view of an apparatus according to a s embodiment of the present invention.

The treated water of Example 1 is further passed through a multi-stage filtration adsorption column 5 (as shown in FIG. 2). The multi-stage filtration adsorption column 5 is filled with activated carbon and has an internal S-shaped path. The main water quality indicators of the effluent are determined and the results are: CODCr=10-20 mg/L, BOD5=1-2 mg/L, SS=0 mg/L, TN=1-6 mg/L, TP<0.28 mg/L, removal efficiency: CODCr≥96%, BOD5≥97%, SS=100%, TN≥90.4%, TP≥94.4%.

Conclusion: The removal rate of nitrogen and phosphorus is further increased by multi-stage filtration and adsorption column treatment.

Example 4

The replaced composite filler in Example 1 is subjected to microwave irradiation for 7 minutes and the microwave power is 1200 W. Then it is washed with pure water to neutral, dried, and mixed with equal weight of polyethylene glycol powder and 1.6% of ethylene glycol, extruded and pelletized with a twin-screw extruder to obtain pellets. The pellets are mixed with microwave-treated composite fillers and 0.3% of a chemical foaming agent is added and mixed uniformly, extruded with a plurality of multiple single-screw extruders connected in series to obtain a regenerated composite filler.

The regenerated composite filler is loaded into the primary SBR reactor 3, and the processing conditions are the same as those in Example 1. After 3 cycles, the results are: CODCr=15-40 mg/L, BOD5=2-11 mg/L, SS=0 mg/L. Ammonia nitrogen=5-24 mg/L, TN=1-12 mg/L, TP<0.7 mg/L, removal efficiency: CODCr≥92.7%, BOD5≥96%, SS=100%, TN≥82.2%, TP≥86%.

Conclusion: the replaced composite fillers can be reused for sewage treatment through recycling. Although the processing capacity has been reduced, the overall effect is good.

Example 5 the effect of the volume of different filler scaffolds on the treatment effect was determined using the method of Example 1:

1) In the primary SBR reactor 3 and the secondary SBR reactor 4, the volume of the filler stents is respectively $3/5$ of the total volume and the filling rate is 42%:

The results are: CODCr=12-32 mg/L, BOD5=1-2.2 mg/L, SS=0 mg/L, TN=1-10 mg/L, TP<0.38 mg/L, removal efficiency: CODCr≥92%, BOD5≥95.6%, SS=100%, TN≥86.8%, TP≥90.9%.

2) In the primary SBR reactor 3 and the secondary SBR reactor 4, the volume of the filler stents is $7/10$ of the total volume and the filling rate is 42%:

The results are: CODCr=10-20 mg/L, BOD5=1-2 mg/L, SS=0 mg/L, TN=1-5 mg/L, TP<0.28 mg/L, removal efficiency: CODCr≥95%, BOD5≥97%, SS=100%, TN≥91.6%, TP≥92.8%.

3) In the primary SBR reactor, the volume of the filler stents is $4/5$ of the total volume, and in the secondary SBR reactor 4 is $4/5$, and the filling rate is 42%:

The results are: CODCr=12-30 mg/L, BOD5=1-2.3 mg/L, SS=0 mg/L, TN=1-10 mg/L, TP<0.35 mg/L, removal efficiency: CODCr≥93%, BOD5≥96.8%, SS=100%, TN≥85.3%, TP≥91.5%.

4) In the primary SBR reactor 3 and the secondary SBR reactor 4, the volume of the filler stents is $9/10$ of the total volume and the filling rate is 42%:

The results are: CODCr=20-40 mg/L, BOD5=1-4 mg/L, SS=0 mg/L, TN=1-20 mg/L, TP<0.85 mg/L, removal efficiency: CODCr≥92.1%. BOD5≥95.2%, SS=100%, TN≥71.2%, TP≥83%.

Conclusion: When the volume of the filler stents is $3/5$-$4/5$ and $2/5$-$4/5$ respectively, the sewage treatment capacity is relatively strong, and is strongest at $7/10$, as volume becomes larger or smaller, the capacity for sewage removal of the device has declined (data not shown).

Example 6

The effect of different dissolved oxygen concentrations on the treatment effect is measured using the method of Example 1.

The early-stage dissolved oxygen concentration (DO) is 2.9 mg/L, and the late-stage dissolved oxygen concentration (DO) is 0.04 mg/L.

The results are: CODCr=10-20 mg/L, BOD5=1-2 mg/L, SS=0 mg/L, ammonia nitrogen=0.5-4 mg/L, TN=1-5.3 mg/L, TP<0.2 mg/L, removal efficiency: CODCr≥96%, BOD5≥97%, SS=100%, TN≥89.2%, TP≥92.5%.

The early-stage dissolved oxygen concentration (DO) is 3.5 mg/L, and the late-stage dissolved oxygen concentration (DO) is 0.08 mg/L.

The results are: CODCr=10-26 mg/L, BOD5=1-2 mg/L, SS=0 mg/L, ammonia nitrogen=0.5-6 mg/L, TN=1-8 mg/L, TP<0.4 mg/L, removal efficiency: CODCr≥96%, BOD5≥97%, SS=100%, TN≥87%, TP≥92%.

Comparative Example 1: the early-stage dissolved oxygen concentration (DO) is 1.5 mg/L, and the late-stage dissolved oxygen concentration (DO) is 0.0005 mg/L.

The results are: CODCr=18-30 mg/L, BOD5=2-20 mg/L, SS=0 mg/L, ammonia nitrogen=5-24 mg/L, TN=2-16 g/L, TP<1.5 mg/L, removal efficiency: CODCr≥93.6%, BOD5≥94.2%, SS=100%, TN≥75.3%, TP≥70%.

Comparative Example 2: the early-stage dissolved oxygen concentration (DO) is 4 mg/L, and the late-stage dissolved oxygen concentration (DO) is 0.1 mg/L.

The results are: CODCr=18-40 mg/L, BOD5=2-28 mg/L, SS=0 mg/L, ammonia nitrogen=5-24 mg/L, TN=3-20 mg/L, TP<2.2 mg/L, removal efficiency: CODCr≥92.3%, BOD5≥92.1%, SS=100%, TN≥68.5%, TP≥56%.

Conclusion: when the early-stage dissolved oxygen concentration is in the range of 2.3-3.5 mg/L, and the late-stage dissolved oxygen concentration is in the range of 0.01 mg/L≤DO<0.08 mg/L, the capacity of sewage treatment is relatively good, especially when the early-stage dissolved oxygen concentration (DO) is 2.9 mg/L, and the late-stage dissolved oxygen concentration (DO) is 0.04 mg/L, the capacity of sewage treatment is the best. When the early-stage and late-stage dissolved oxygen concentration are not within the above range, the sewage treatment capacity was relatively low.

Example 7

Compared with Example 1, the composition and proportions of modified sponge iron and other components are different, and the resulting composite filler components are different, as shown in Table 1:

TABLE 1

Different composition and proportions of modified sponge iron and other components

| | modified sponge iron | montmorillonite | porous glass | calcined clay | magnesia | bauxite | photo crosslinked prepolymer | paulownia coarse particles |
|---|---|---|---|---|---|---|---|---|
| Example 1 | 25 | 6 | 1 | 2 | 1.2 | 1.5 | 5 | 20 |
| Comp. Example 1 | 34 | 7.5 | 2.5 | 2.5 | 3.6 | 2.5 | 8 | 21 |
| Comp. Example 2 | 43 | 9 | 4 | 3 | 6 | 3.5 | 11 | 22 |

The results of Comparative Example 1 are: CODCr=10-20 mg/L, BOD5=1-2 mg/L, SS=0 mg/L, TN=1-7.8 mg/L, TP<0.38 mg/L, removal efficiency: CODCr≥96%, BOD5≥97%, SS=100%, TN≥83.5%, TP≥89.4%.

The results of Comparative Example 2 are: CODCr=10-20 mg/L, BOD5=1-2 mg/L, SS=0 mg/L, TN=1-6 mg/L, TP<0.4 mg/L, removal efficiency: CODCr≥96%, BOD5≥97%, SS=100%, TN≥84.6%, TP≥88.2%.

Conclusion: The sponge iron and the final composite filler prepared by the method and the component proportions of Example 1 has the best sewage treatment capacity.

Example 8

The effect of different sewage temperature on the treatment effect is determined using the method of Example 1, as shown in Table 2:

TABLE 2

Determination of the effect of different sewage temperature on the treatment effect

| | Sewage Temperature | | | | |
|---|---|---|---|---|---|
| | 23° C. | 28° C. | 30° C. | 32° C. | 35° C. |
| CODCr | 5-40 mg/L; removal efficiency ≥ 94% | 10-20 mg/L; removal efficiency ≥ 96% | 10-20 mg/L; removal efficiency ≥ 96% | 10-18 mg/L; removal efficiency ≥ 96.2% | 12-32 mg/L; removal efficiency ≥ 94.2% |
| BOD5 | 2-25 mg/L; removal efficiency ≥ 92.8% | 1-2 mg/L; removal efficiency ≥ 97% | 1-2 mg/L; removal efficiency ≥ 97% | 1-2 mg/L; removal efficiency ≥ 97% | 2-24 mg/L; removal efficiency ≥ 93.1% |

TABLE 2-continued

Determination of the effect of different sewage temperature on the treatment effect

| | Sewage Temperature | | | | |
|---|---|---|---|---|---|
| | 23° C. | 28° C. | 30° C. | 32° C. | 35° C. |
| SS | 0 mg/L; removal efficiency 100% | 0 mg/L; removal efficiency 100% | 0 mg/L; removal efficiency 100% | 0 mg/L; removal efficiency 100% | 0 mg/L; removal efficiency 100% |
| TN | 2-23 mg/L; removal efficiency ≥ 65.7% | 1-7 mg/L; removal efficiency ≥ 87% | 1-5.6 mg/L; removal efficiency ≥ 91% | 1-6.7 mg/L; removal efficiency ≥ 87.4% | 3-12.3 mg/L; removal efficiency ≥ 79% |
| TP | <1.6 mg/L; removal efficiency ≥ 68% | <0.3 mg/L; removal efficiency ≥ 92% | <0.29 mg/L; removal efficiency ≥ 92.5% | <0.32 mg/L; removal efficiency ≥ 91.8% | <1.24 mg/L; removal efficiency ≥ 75.2% |

Conclusion: When the sewage temperature is 28-32° C., the treatment effect is excellent, especially at 30° C., the sewage treatment effect is best, when the sewage temperature is lower than 28° C. or higher than 32° C., the sewage treatment effect decreased significantly.

The sewage treatment process and system provided by the present invention have been described in detail above. The specific embodiments are used in this specification to describe the principle and implementation manners of the present invention. For those skilled in the art, the specific implementation manner and application scope may change during implementation based on the ideas according to the present invention. Therefore, what is described in the present specification should not be construed as limiting the present invention.

We claim:

1. An apparatus for removing nitrogen and phosphorus from sewage using sponge iron and activated sludge, comprising
    a raw sewage tank (1) for accommodating sewage,
    a pH adjusting tank (2) connected to the raw sewage (1) for adjusting the sewage to pH 6.5-7.5 and is provided at a bottom with a first vent valve (21),
    a temperature adjustment device (15) inside the pH adjusting tank (2) for adjusting the temperature of the sewage to 28-32° C.,
    a primary SBR (3) connected to the pH adjusting tank (2) and comprises a first support plate (35), and a first filler stent (31) mounted between the first support plate (35) and a top of the primary SBR (3) for accommodating a composite filler and the activated sludge,
    an intermediate tank (10) connected to the primary SBR (3) and is provided at a bottom with a second vent valve (101),
    a secondary SBR (4) connected to the intermediate tank (10) and the pH adjusting tank (2), respectively, the secondary SBR (4) comprises a second support plate (45) and a second filler stent (41) mounted between the second support plate (45) and a top of the secondary SBR (4) for accommodating the composite filler and the activated sludge, and
    a discharge tank (11) connected to the secondary SBR (4) and is provided at a bottom with a third vent valve (111),
    wherein the composite filler is an extrusion of a second solid phase mixture formed of a polyethylene glycol powder and an ethylene glycol, a first solid phase mixture, a nano silica and a chemical foaming agent, wherein the first solid phase mixture is formed of a modified sponge iron solid, a montmorillonite, a porous glass, a calcined clay, a magnesia, a bauxite, a photo-crosslinked prepolymer, and a paulownia coarse granule, wherein the modified sponge iron solid is obtained by treating the sponge iron with a dilute acid solution and a copper sulfate solution, and
    wherein the activated sludge is an acclimated sludge obtained from inoculating the activated sludge under a condition of only exposure to air without water inlet.

2. The apparatus according to claim 1, wherein,
the primary SBR (3) further comprises:
    a first aeration device (91) located under the first support plate (35), which is supplied by a first air pump (71) outside of the primary SBR (3), wherein a first gas flow control valve (81) is provided at a pipeline between the first aeration device (91) and the first air pump (71),
    a first agitator (34) between the first aeration device (91) and the first support plate (35), the first agitator (34) being driven by a first drive motor (33) located outside the primary SBR (3),
    a dissolved oxygen concentration measuring device (13) for determining the dissolved oxygen concentration in the primary SBR (3), and
    a first drain valve (32) located at an upper part for discharging the sewage in the primary SBR (3) to the intermediate tank (10); and
the secondary SBR (4) further comprises:
    a second aeration device (92) located under the second support plate (45), which is supplied by a second air pump (72) outside the secondary SBR (4), wherein a second gas flow control valve (82) is provided at a pipeline between the second aeration device (92) and the second air pump (72),
    a second agitator (44) between the second aeration device (92) and the second support plate (45), the second agitator (44) being driven by a second drive motor (43) located outside the secondary SBR (4),
    a dissolved oxygen concentration measuring device (14) for determining the dissolved oxygen concentration in the secondary SBR (4), and
    a second drain valve (42) located at an upper part for discharging the sewage in the secondary SBR (4) to the discharge tank (11).

3. The apparatus according to claim 2, wherein the apparatus further comprises a multi-stage filtration adsorption column (5) to purify water from the discharge tank (11), and discharge the purified water from an outlet of the multi-stage filtration adsorption column (5), a first to fourth inlet water pumps (61, 62, 63, 64) are provided between the pH adjustment tank (2) and the primary SBR (3), between the intermediate tank (10) and the secondary SBR (4), between the discharge tank (11) and the multi-stage filtration adsorption column (5), and between the pH adjustment tank (2) and the secondary SBR (4); and the first inlet water pump (61), the second inlet water pump (62), the third inlet water pump (63), the first gas flow control valve (81), and the second gas flow control valves (82) are all electrically connected to a PLC automation controller (12) for control operation.

4. The apparatus according to claim 1, wherein the volume of the first filler stent (31) accounts for ⅗ to ⅘ of the total volume of the primary SBR (3), and the volume of the second filler stent (41) accounts for ⅗ to ⅘ of the total volume of the secondary SBR (4).

5. The apparatus according to claim 1, wherein the paulownia coarse granule is made from branches of natural paulownia through cutting, treating with sodium bicarbonate solution, steaming and crushing.

6. The apparatus according to claim 1, wherein the activated sludge is a mixture of a remaining fresh sludge from a sewage treatment plant and a granular sludge from anammox and anaerobic granular sludge at a volume ratio of 2:1.

7. The apparatus according to claim 1, wherein the activated sludge further comprises iron bacteria, the percentage of the iron bacteria in the total weight of the activated sludge is 0.03-0.1 wt %.

\* \* \* \* \*